United States Patent [19]

Desblache

[11] 4,245,320
[45] Jan. 13, 1981

[54] METHOD AND DEVICE FOR MEASURING THE SLOPE OF THE ENVELOPE DELAY CHARACTERISTIC OF A TRANSMISSION CHANNEL AND THEIR APPLICATION TO AN AUTOMATIC EQUALIZER SELECTION TECHNIQUE

[75] Inventor: André E. Desblache, Nice, France

[73] Assignee: International Business Machines Corporation, Armonk, N.Y.

[21] Appl. No.: 950,489

[22] Filed: Oct. 11, 1978

[30] Foreign Application Priority Data

Oct. 27, 1977 [FR] France ............................. 77 33120

[51] Int. Cl.$^3$ .................... H04B 3/46; G06F 15/31
[52] U.S. Cl. ............................ 364/514; 324/57 DE; 364/487; 375/57; 375/83
[58] Field of Search ............................ 364/487, 514; 324/57 DE, 77 E, 83 Q; 325/65, 67, 363; 375/57, 83

[56] References Cited

U.S. PATENT DOCUMENTS

| 3,629,696 | 12/1971 | Bartelink | 325/67 X |
| 3,706,931 | 12/1972 | Subramanian | 325/67 |
| 3,842,247 | 10/1974 | Anderson | 325/67 X |
| 4,039,769 | 8/1977 | Bradley | 324/57 DE X |

Primary Examiner—Jerry Smith
Attorney, Agent, or Firm—Gerald R. Woods

[57] ABSTRACT

A method and device for measuring the slope of the envelope delay characteristic in a transmission channel. The slope is determined from a received measurement signal having a frequency spectrum that includes three rays at frequencies $f_o$, $f_1$ and $f_2$, which are approximately located in the center and at the edges of the useful passband of the channel. At the output of the channel, the three components at frequencies $f_o$, $f_1$ and $f_2$ are extracted from the received measurement signal, and the instantaneous phases $\psi 0$, $\psi 1$ and $\psi 2$ of these three components are measured. The value of the slope S of the envelope delay characteristic is obtained from the relation $$S = \frac{4}{2\pi (f_2 - f_1)} (2\psi 0 - \psi 1 - \psi 2 - 2\phi_0' + \phi_1' + \phi_2')$$

where $\phi_0'$, $\phi_1'$ and $\phi_2'$ are the phases of the three rays at frequencies $f_o$, $f_1$ and $f_2$ of the measurement signal sent over the channel. When the data transmission system employs double sideband-quadrature carrier (DSB-QC) modulation, the measurement signal is generated by causing the carrier to undergo successive phase changes of $+\pi/2$ and $-\pi/2$ radians at the signaling rate. The receiver includes a set of fixed equalizers and the appropriate fixed equalizer is selected as a function of the measured slope.

13 Claims, 9 Drawing Figures

METHOD AND DEVICE FOR MEASURING THE SLOPE OF THE ENVELOPE DELAY CHARACTERISTIC OF A TRANSMISSION CHANNEL AND THEIR APPLICATION TO AN AUTOMATIC EQUALIZER SELECTION TECHNIQUE

TECHNICAL FIELD

This invention relates to data transmission systems and, more particularly, to a method and a device for measuring the slope of the envelope delay characteristic of a transmission channel for use in selecting a fixed equalizer from a set of available equalizers.

Basically, a data transmission system comprises a transmitter, a transmission channel and a receiver. The transmitter converts digital data to be transmitted into signals more suitable for transmission over the channel. The receiver converts the signals received from the channel into digital data which are then fed to a data storage or utilization device. Since the efficiency of the transmitter and the receiver combination is directly related to the characteristics of the transmission channel, the characteristics of the transmission channel must be known in order to design the transmitter and the receiver.

BACKGROUND ART

Most transmission channels, such as those composed of public telephone lines, exhibit the same types of characteristics and differ from each other only in the degree of significance of the various factors involved. Transmission channels are usually characterized by amplitude and envelope delay characteristics which vary as a function of frequency. The amplitude characteristic gives the attenuation in decibels for each frequency that lies within the passband of the channel. The envelope delay for a given frequency is the propagation time of that frequency through the transmission channel. The envelope delay characteristic represents the relative propagation times in milliseconds of the frequencies that lie within the passband of the channel. For more complete definitions, reference may be made to the Bell System Data Communications Technical Reference entitled, "Transmission Parameters Affecting Voiceband Data Transmission—Description of Parameters," PUB 41008, July 1974. The amplitude and envelope delay characteristics lie within given profiles that define the quality of the transmission channel or, as it is sometimes referred to, the "quality of the line." The technique that is the most widely used for measuring the envelope delay characteristic is described in the Bell System Data Communications Technical Reference entitled, "Transmission Parameters Affecting Voiceband Data Transmission—Measuring Techniques," PUB 41009, January 1972. Briefly, this technique consists of measuring the slope of the phase-frequency characteristic of the line for each frequency lying within the passband of the line. This technique is both complex and time-consuming and requires special test equipment which the telephone companies alone may use to test their lines. Also, the user of a line is generally unaware of its exact envelope delay characteristic and merely knows the profile, as indicated by the telephone company, within which this characteristic lies. It has been found that a knowledge of both the profile of the envelope delay characteristic and the slope of that characteristic is sufficient for the purposes of many applications.

The envelope delay characteristic is an important feature of a transmission channel. Since the envelope delay varies with frequency, a signal transmitted over a channel undergoes a certain amount of distortion which combines with the amplitude distortion to create an interference between successive pulses that is known as intersymbol interference. Theoretically, if the precise envelope delay and amplitude characteristic were known, the effects of intersymbol interference could be eliminated by constructing a filter whose transfer function would be the inverse of that of the channel. In practice, however, these characteristics are not precisely known. In addition, the characteristics vary slowly with time.

The effects of intersymbol interference can be eliminated, or at least reduced, by means of a well-known automatic and adaptive device called an equalizer. An adaptive equalizer is a complex device whose cost significantly affects the overall cost of the receiver into which it is incorporated.

In data transmission systems in which the signaling rate is equal to or lower than 2400 bits per second, the effects of intersymbol interference are less detrimental to transmission and provision is normally made for a single fixed equalizer called a compromise equalizer which is much less expensive than an adaptive equalizer. A set of fixed equalizers having different transfer functions may be substituted for the single fixed equalizer. An initialization procedure permits selection of the particular equalizer to be used for a given transmission. The most widely used initialization procedure consists of sequentially connecting the various equalizers in the transmission path and then selecting the particular equalizer which gives the best results. This procedure is time-consuming and, consequently, increases the cost of the transmission.

SUMMARY

Since the intersymbol interference is dependent upon the envelope delay distortion, it has been found that a method of measuring the slope of the envelope delay characteristic can be used to automatically select a fixed equalizer from a set of available equalizers.

It is an object of the present invention to provide a method and a device that can be employed by the user of a transmission channel to measure the slope of the envelope delay characteristic of said channel.

It is another object of this invention to provide such a method and device that involve the use of simpler and less expensive equipment than heretofore required.

It is another object of this invention to provide a method and a device for measuring the slope of the envelope delay characteristic of a channel, so that the slope can be quickly determined during the initialization phase of a data transmission system.

It is still another object of the invention to provide a method and a device for automatically selecting one fixed equalizer in a data transmission system that uses a set of such equalizers.

These and other objects are attained by providing a method and a device wherein a measurement signal is sent through the transmission channel, and the slope of the envelope is then determined from the measurement signal received at the output of the channel. In accordance with the method of the present invention, the transmitted measurement signal has a frequency spectrum that includes three rays at frequencies $f_0$, $f_1$ and $f_2$, which are located approximately in the center and at the edges of the useful passband of the channel. At the output of the channel, the three components at frequencies $f_0$, $f_1$ and $f_2$ are extracted from the received measurement signal, and the instantaneous phases $\psi_0$, $\psi_1$ and $\psi_2$ of these three components are measured. The value of the slope S of the envelope delay characteristic is obtained from the relation $$S = \frac{4}{2\pi (f_2 - f_1)} (2\psi_0 - \psi_1 - \psi_2 - 2\phi_0' + \phi_1' + \phi_2')$$

where $\phi_0'$, $\phi_1'$ and $\phi_2'$ are the phases of the three rays at frequencies $f_0$, $f_1$ and $f_2$ of the measurement signal sent over the channel.

According to another aspect of the invention, when the data transmission system employs double sideband-quadrature carrier (DSB-QC) modulation, the measurement signal is generated by causing the carrier to undergo successive phase changes of $+\pi/2$ and $-\pi/2$ radians at the signaling rate.

According to another aspect of the invention, when the data transmission system used DSB-QC modulation and the receiver includes a set of fixed equalizers, the appropriate fixed equalizer is selected from that set as a function of the measured slope.

BRIEF DESCRIPTION OF THE DRAWINGS

The foregoing and other objects, features and advantages of the invention will be apparent from the following detailed description of a preferred embodiment of the invention, as illustrated in the accompanying drawings wherein.

DETAILED DESCRIPTION

Figure 1:
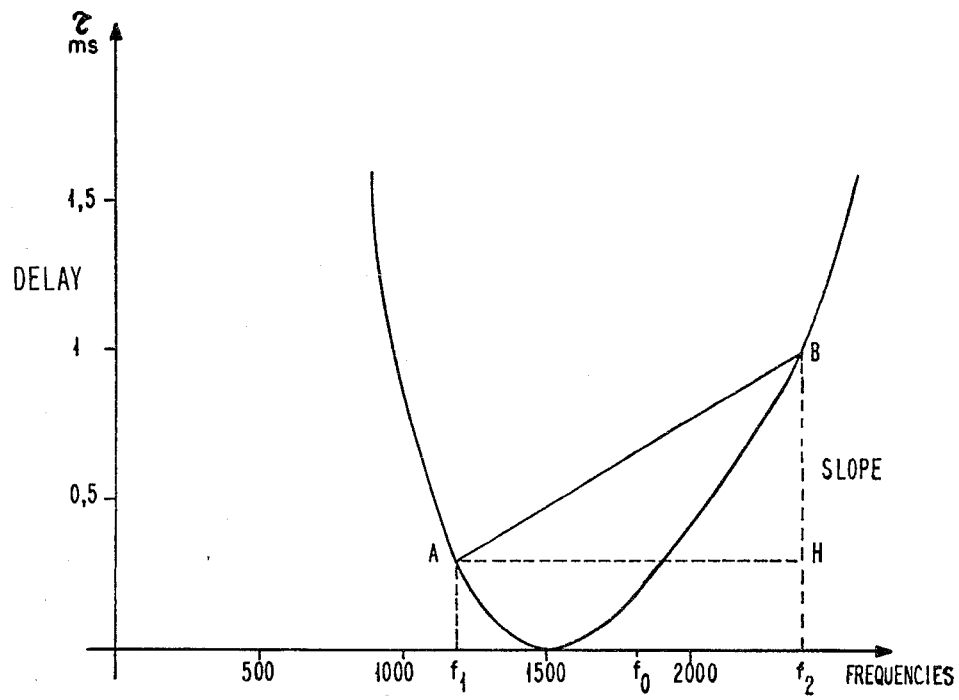
FIG. 1 illustrates a typical envelope delay characteristic of a voiceband transmission channel.

Referring now to FIG. 1, a typical envelope delay characteristic of a 300–3400 Hz voiceband transmission channel is shown. The curve represents the relative envelope delays at various frequencies with the envelope delay at frequency 1500 Hz taken as a reference. Points A and B on this curve represent the envelope delays at frequencies $f_1 = 1200$ Hz and $f_2 = 2400$ Hz, while point H is the projection of point A on the perpendicular to the axis of frequencies at point $f_2 = 2400$ Hz. The envelope delay characteristic can be defined by means of its slope, which is represented by line segment BH. Frequencies $f_1$ and $f_2$ lie at the edges of the useful passband of the transmission channel. In general, these frequencies are those for which an attenuation of $-6$ dB or $-3$ dB is obtained on the amplitude/frequency characteristic of the transmitted signal.

To measure a slope such as that shown in FIG. 1, a measurement signal whose frequency spectrum is composed of three rays at frequencies $f_0$, $f_1$ and $f_2$ is sent over the transmission channel. Frequencies $f_1$ and $f_2$ are those defined above and frequency $f_0$ lies midway between $f_1$ and $f_2$. In FIG. 1, $f_0$ is equal to 1800 Hz. In a synchronous data transmission system employing DSB-QC modulation, the selected value of $f_0$ would be equal to the carrier frequency, and the values of $f_1$ and $f_2$ would be:

$$f_1 = f_0 - \tfrac{1}{2}T \qquad f_2 = f_0 + \tfrac{1}{2}T$$

where $1/T$ is the signaling rate.

The term DSB-QC modulation is used here in a broad sense in order to encompass all systems where the transmitted signal can be represented by superimposing two amplitude modulated quadrature carriers. Thus, the term DSB-QC includes phase-shift keying (PSK), amplitude phase-shift keying (A-PSK), and quadrature amplitude (QAM) modulation.

For clarity and simplicity, the method of measurement of the present invention as incorporated into a synchronous data transmission system employing DSB-QC modulation will first be described. The use of the present method to measure the slope of the envelope delay characteristic of transmission channels in general will then be described.

Where the present invention is utilized in a data transmission system employing DSB-QC modulation, the measurement signal defined above is generated by causing the transmitted carrier to undergo successive phase changes of $+\pi/2$ and $-\pi/2$ radians at the signaling rate $1/T$. It can readily be verified that the signal thus obtained exhibits a spectrum composed of three rays, one of which is at the carrier frequency $f_0$ while the remaining rays are at frequencies $f_1$ and $f_2$, as defined above.

Figure 2:
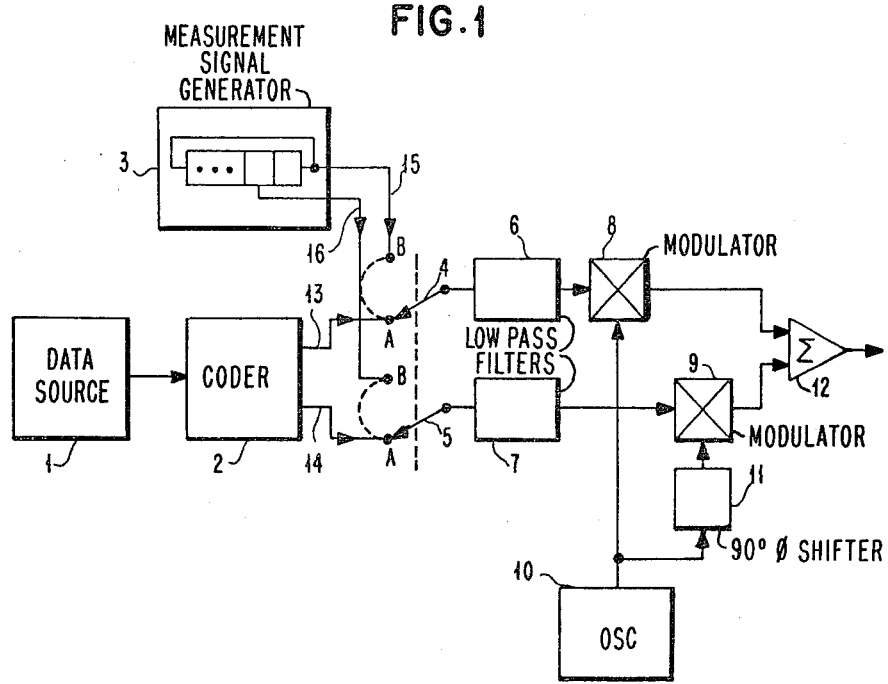
FIG. 2 is a block diagram of a transmitter employing DSB-QC modulation.

Referring now to FIG. 2, a simplified block diagram of a DSB-QC transmitter incorporating the present invention is shown. Note that this transmitter could be a PSK, an A-PSK or a QAM transmitter, since all three have the same configuration. With the exception of the measurement signal generator 3, the transmitter is a conventional transmitter for a synchronous data transmission system employing DSB-QC modulation. The transmitter includes a data source 1, a coder 2, a measurement signal generator 3, a pair of two-position switches 4 and 5, two low-pass filters 6 and 7, two modulators 8 and 9, an oscillator 10, a 90° phase shifter 11 and a summing device 12. The data source 1 is connected to the input of coder 2, outputs of which are connected via lines 13 and 14 to positions A of the switches 4 and 5, respectively. The measurement signal generator 3 has two outputs connected via lines 15 and 16 to positions B of the switches 4 and 5, respectively. The outputs of switches 4 and 5 are connected to the respective inputs of two identical low-pass filters 6 and 7, the outputs of which are connected to modulators 8 and 9, respectively. A second input to modulator 8 is provided by an oscillator 10 while a second input to modulator 9 is provided by a 90° phase shifter 11 at the output of oscillator 10. The outputs of modulators 8 and 9 are connected to the (+) and (−) inputs of summing device 12, the output of which is connected to the input of the transmission channel.

When the system is transmitting data, switches 4 and 5 are both set to position A. The data bits to be transmitted from source 1 are converted in coder 2 into two sequences of symbols. At each of the signaling instants defined by the signaling rate 1/T expressed in bauds, a symbol from each sequence is fed via one of the switches 4 and 5 to one of the filters 6 and 7. A pair of symbols represents the in-phase and quadrature components in a system of rectangular coordinates of the signal to be transmitted. The in-phase and quadrature components are respectively available on lines 13 and 14. Each of these components takes the form of a pulse, the amplitude of which is related to the value of that component. The pulses corresponding to the in-phase and quadrature components are applied to filters 6 and 7 which convert the pulses into a pair of signals called baseband signal elements having shapes more suitable for transmission. The signal elements so obtained are respectively used to modulate an "in-phase" carrier and a "quadrature" carrier by means of modulators 8 and 9. The in-phase carrier is directly provided by oscillator 10 whereas the quadrature carrier is obtained by using the 90° phase shifter 11 to introduce a 90° change in the phase of the carrier supplied by oscillator 10. The modulated signals obtained at the output of modulators 8 and 9 are combined in summing device 12 and applied to the input of the transmission channel.

Figure 3:
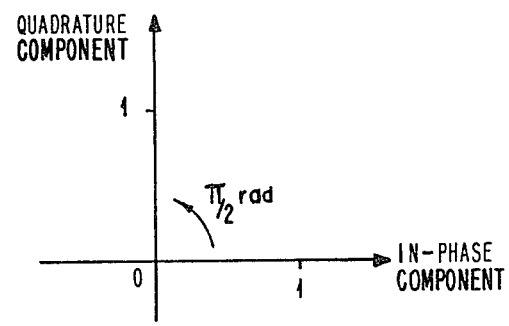
FIG. 3 is a diagram illustrating the signal points used to generate the measurement signal.

In the example shown in FIG. 2, the measurement signal is generated by repetitively causing the phase of the carrier to be successively equal to 0 and $+\pi/2$ radians. It will be appreciated that a carrier whose phases are equal to $0, \pi/2, 0, \pi/2, 0, \pi/2, 0\pi/2 \ldots$ is equivalent to a carrier exhibiting phase changes of $+\pi/2, -\pi/2, +\pi/2, -\pi/2 \ldots$. To cause the phase of the carrier to be equal to 0, a signal whose in-phase and quadrature components are respectively equal to 1 and 0 is transmitted. To cause the phase of the carrier to be equal to $\pi/2$, a signal whose in-phase and quadrature components are respectively equal to 0 and 1 is transmitted (see FIG. 3). Referring again to FIG. 2, in the measurement mode of operation, switches 4 and 5 are both set to position B. Measurement signal generator 3 provides a sequence X: 101010101 ..., on line 15, and a sequence Y: 010101010 ..., on line 16, at the signaling rate. Both sequences can be obtained from a single shift register which stores sequence 10101010 ... where the first and second register stages are connected to lines 15 and 16, respectively. The application of sequences X and Y to lines 15 and 16 results in the transmission of signals whose in-phase and quadrature components are equal to (1,0), (0,1), (1,0,), (0.1), ..., that is, in the transmission of a carrier that exhibits successive phase changes of $+\pi/2$ and $-\pi/2$ radians.

Figure 4:
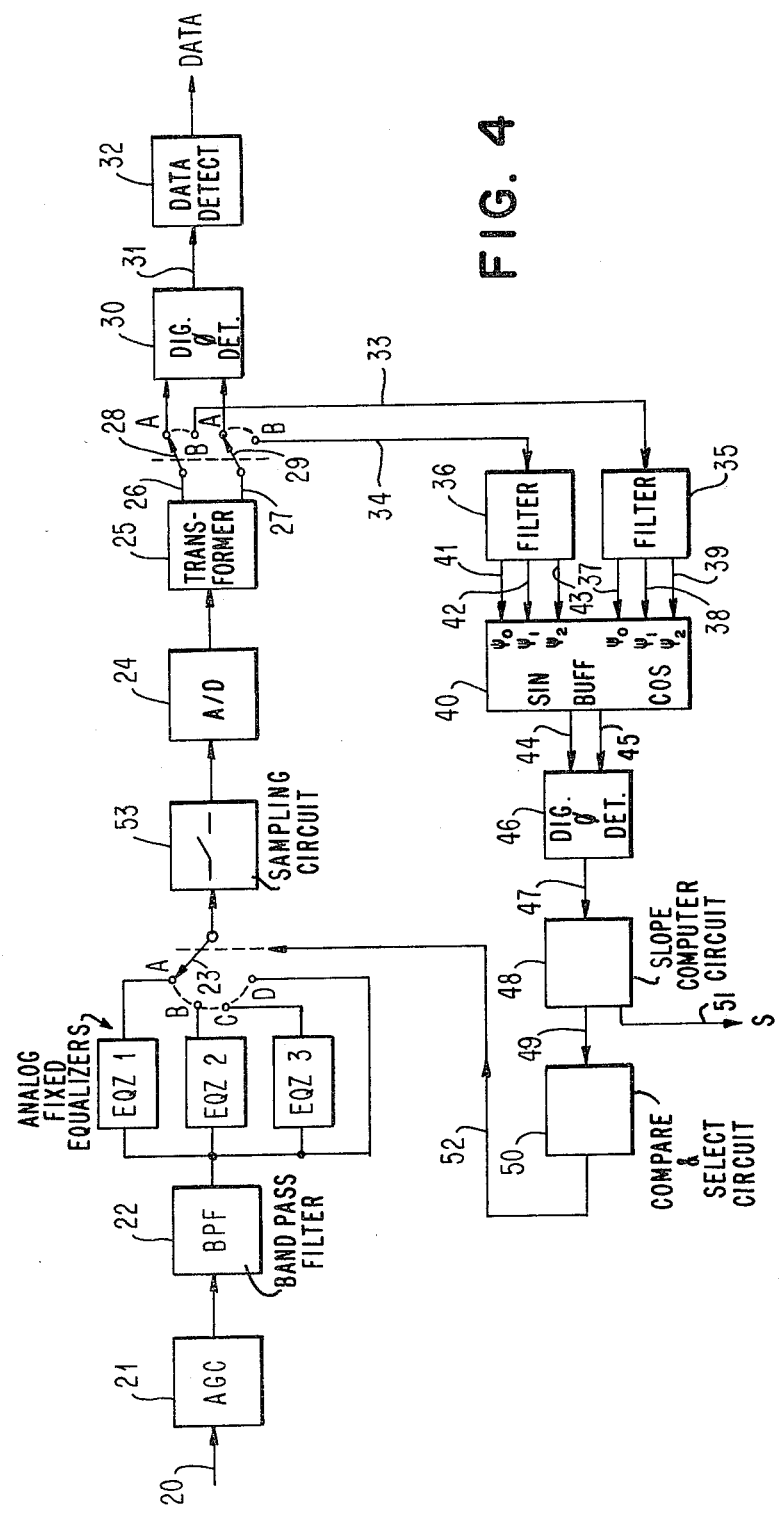
FIG. 4 is a block diagram of a DSB-QC receiver incorporating the invention.

FIG. 4 is a block diagram of a data receiver incorporating the invention in the context of a transmission system using DSB-QC modulation. The signal received from the transmission channel via line 20 is applied to an automatic gain control (AGC) circuit 21 which normalizes the energy of the signal. The output from AGC circuit 21 is applied to a bandpass filter 22 which rejects out-of-band noise. The output from filter 22 is applied in parallel to a set of analog fixed equalizers. For clarity, only three equalizers, EQZ 1, EQZ 2, EQZ 3, have been illustrated. An analog fixed equalizer is a well-known device, an exemplary description of which may be found in French Pat. No. 70 26336, publication No. 2,097,657. The outputs of equalizers EQZ 1–EQZ 3 are respectively connected to positions A, B and C of a four-position switch 23. Position D of switch 23 is directly connected to the output of filter 22. The common output of switch 23 is connected to the input of a sampling device 53, the output of which is connected to the input of an analog-to-digital (A/D) converter 24. The output of converter 24 is connected to the input of a digital Hilbert transformer 25. A Hilbert transformer is a device which supplies the in-phase and quadrature components of an input signal. A digital embodiment of such a device is described in an article by L. R. Robiner and C. M. Rader entitled, "Theory and Implementation of the Discrete Hilbert Transform," in Digital Signal Processing, IEEE Press, 1972. The Hilbert transformer 25 has two outputs that are connected via lines 26 and 27 to the respective common inputs of a pair of two-position switches 28 and 29. This system may be any DSB-QC detection system. In the receiver depicted in FIG. 4, a PSK detection system has been shown by way of example. Positions A of switches 28 and 29 are respectively connected to the inputs of a digital phase detector 30, the output of which is connected via line 31 to the input of a data detection device 32. A detailed description of a digital phase detector may be found in U.S. Pat. No. 3,825,737, and an exemplary embodiment of a suitable data detection device is described in U.S. Pat. No. 3,972,000. Positions B of switches 28 and 29 are connected via lines 33 and 34 respectively to the input of two identical filters 35 and 36 which will be described later with reference to FIG. 5. Filter 35 has three outputs connected via lines 37, 38 and 39 to the input of a buffer 40 to be described later with respect to FIG. 6. Filter 36 also has three outputs which are connected via lines 41, 42 and 43 to the input of buffer 40. Buffer 40 has two outputs connected via lines 44 and 45 to the input of a digital phase detector 46 identical to detector 30. The output of detector 46 is connected via line 47 to the input of a slope computation device 48, an output of which is connected via line 49 to the input of a comparison and selection device 50. The output from device 50 controls the operation of switch 23 via line 52.

In the data mode of operation, switches 28 and 29 are both set to position A. It will be assumed that the appropriate equalizer, for example EQZ 1, has previously been selected and that switch 23 has been set to position A. The data signal received from the transmission channel passes through AGC circuit 21, bandpass filter 22 and equalizer EQZ 1. The output signal from EQZ 1 is sampled at the signaling rate 1/T, and is converted to digital form in A/D converter 24. The output from converter 24 is applied to Hilbert transformer 25 which provides the in-phase and quadrature components of the input signal on lines 26 and 27, respectively. Phase detector 30 extracts from these components the phase of the received signal and data detection device 32 derives therefrom the received data. Since the present invention does not relate to data detection, operation of the receiver in the data mode will not further be described.

In the measurement mode of operation, the transmitter (FIG. 2) generates the measurement signal by causing the carrier to undergo consecutive phase changes of $+\pi/2$ and $-\pi/2$ radians at the signaling rate. The spectrum of this signal consists of three rays, one of which is at the carrier frequency $f_0$ and the remaining two of which are at the frequencies $f_1$ and $f_2$, as previously defined.

Accordingly, the measurement signal being transmitted is obtained by superimposing three sine waves, the respective frequencies of which are $f_0$, $f_1$ and $f_2$. These three sine waves may be expressed in simplified form as follows:

$$\left.\begin{array}{l} \cos(2\pi f_0 t - \frac{\pi}{4}) \\ \cos(2\pi f_1 t + \frac{\pi}{4}) \\ \cos(2\pi f_2 t + \frac{\pi}{4}) \end{array}\right\} \quad (1)$$

where $-\pi/4$, $+\pi/4$ and $+\pi/4$ represent the phases of the three sine waves which result from the carrier phase changes. The measurement signal obtained at the input of the receiver takes the form of three superimposed sine waves $F_0$, $F_1$ and $F_2$ which may be expressed as $$\left.\begin{array}{l} F_0 : \cos(2\pi f_0 t - \frac{\pi}{4} + \phi_0) \\ F_1 : \cos(2\pi f_1 t + \frac{\pi}{4} + \phi_1) \\ F_2 : \cos(2\pi f_2 t + \frac{\pi}{4} + \phi_2) \end{array}\right\} \quad (2)$$

where $\phi_0$, $\phi_1$ and $\phi_2$ represent the phase changes introduced by the transmission channel.

It is convenient to obtain the instantaneous phases $\psi_0$, $\psi_1$ and $\psi_2$ of sine waves $F_0$, $F_1$ and $F_2$, respectively, by writing relations (2) as $$\left.\begin{array}{l} F_0 : \cos \psi_0 \\ F_1 : \cos \psi_1 \\ F_2 : \cos \psi_2 \end{array}\right\} \quad (3)$$

where $$\left.\begin{array}{l} \psi_0 = 2\pi f_0 t - \frac{\pi}{4} + \phi_0 \\ \psi_1 = 2\pi f_1 t + \frac{\pi}{4} + \phi_1 \\ \psi_2 = 2\pi f_2 t + \frac{\pi}{4} + \phi_2 \end{array}\right\} \quad (4)$$

The slope of the envelope delay characteristic shown in FIG. 1 may be written $$S = \tau(f_2) - \tau(f_1) \quad (5)$$

where $\tau(f_1)$ and $\tau(f_2)$ represent the respective envelope delays at frequencies $f_1$ and $f_2$.

Assuming that the envelope delay characteristic is a curve of the second degree, it can be shown that the slope S may be expressed as $$S = \frac{4}{2\pi(f_2 - f_1)}(2\phi_0 - \phi_1 - \phi_2) \quad (6)$$

Combining relations (6) and (4) and using the definition $$f_0 = (f_1 + f_2)/2$$

the slope S may be written $$S = \frac{4}{2\pi(f_2 - f_1)}(\pi + 2\psi_0 - \psi_1 - \psi_2) \quad (7)$$

In practice, it may prove sufficient for the purposes of many applications to know the quantity $\theta$ defined as $$\theta = (\pi/2)(f_2 - f_1)S \quad (8)$$

which, in accordance with (7), may be written as $$\theta = \pi + 2\psi_0 - \psi_1 - \psi_2 \quad (9)$$

and which is representative of slope S. Note that relations (6), (7), and (9) are not frequency dependent.

The receiver shown in FIG. 4 uses relation (7) to determine slope S.

In the measurement mode of operation, switches 28 and 29 are both set to position B and switch 23 is initially set to position D. The measurement signal received via line 20 is transmitted through AGC circuit 21, filter 22, switch 23 (set to position D) and sampling device 53, and is converted to digital form in A/D converter 24. The output from A/D converter 24 is fed to Hilbert transformer 25 which provides the in-phase and quadrature components of the received signal on lines 26 and 27, respectively. The in-phase component is applied to filter 35 through switch 28 and line 33. Filter 35 generally consists of three elementary filters centered at frequencies $f_0$, $f_1$ and $f_2$. Filter 35 extracts the in-phase components of the signal at frequencies $f_0$, $f_1$ and $f_2$. The components at frequencies $f_0$, $f_1$ and $f_2$ of the received signal are the sine waves $F_0$, $F_1$ and $F_2$ defined earlier. The in-phase components $\cos \psi_0$, $\cos \psi_1$ and $\cos \psi_2$ of the signals $F_0$, $F_1$ and $F_2$ are respectively obtained on output lines 37, 38 and 39 from filter 35. The quadrature component of the signal received on line 27 is applied via switch 29 and line 34 to filter 36, which is identical to filter 35. The quadrature components $\sin \psi_0$, $\sin \psi_1$ and $\sin \psi_2$ of signals $F_0$, $F_1$ and $F_2$ are respectively obtained on output lines 41, 42 and 43 from filter 36. The in-phase and quadrature components of signals $F_0$, $F_1$ and $F_2$ are applied to buffer 40 where they are stored in registers and sequentially inputted in pairs to a conventional phase detector 46 as follows. Buffer 40 supplies, on lines 44 and 45, respectively, components $\cos \psi_0$ and $\sin \psi_0$, then components $\cos \psi_1$ and $\sin \psi_1$ and finally components $\cos \psi_2$ and $\sin \psi_2$. Phase detector 46 derives the value of instantaneous phase $\psi_1$ from components $\cos \psi_1$ and $\sin \psi_1$, and the value of instantaneous phase $\psi_2$ from $\cos \psi_2$ and $\sin \psi_2$.

Those skilled in the art will readily understand that, although the receiver of FIG. 4 is shown as including two phase detectors, 30 and 46, this is only for clarity. An actual receiver would include a single phase detector to be used as detector 46 in the measurement mode of operation and as detector 30 in the data mode.

Phases $\psi_0$, $\psi_1$ and $\psi_2$ are sequentially applied to slope computation device 48. Device 48 computes the slope S of the envelope delay characteristic in accordance with relation (7) which is repeated below for convenience:

$$S = \frac{4}{2\pi(f_2 - f_1)}(\pi + 2\psi_0 - \psi_1 - \psi_2) \quad (7)$$

The digital value of slope S is available on output line 51 from device 48.

The value of slope S having thus been obtained, the appropriate fixed equalizer can be automatically selected from that value. As mentioned earlier, the telephone companies provide the profile within which the envelope delay characteristics of lines of a given quality lie. This makes it possible to determine the range within which the slopes S of lines of that quality lie. For example, the CCITT recommendations for an unconditioned line specify a range of slopes of 1.7 ms. In accordance with the selection method of the present invention, the range of slopes is divided up into N intervals and a fixed equalizer is provided for each of these. The slope S of the line being used is measured and the interval within which the measured slope S lies is selected together with the associated fixed equalizer. Referring again to FIG. 4, it is assumed that the range of slopes defined by its extreme values, for example $S_0$ and $S_3$, is divided into three intervals I, II and III, which are respectively defined by their extreme slope values $S_0$-$S_1$, $S_1$-$S_2$ and $S_2$-$S_3$. It is further assumed that equalizers EQZ 1, EQZ 2, and EQZ 3 are respectively associated with intervals I, II and III. It is therefore necessary, in order to determine in which interval the measured slope S lies, to compare that measured slope with the slope values $S_0$, $S_1$, $S_2$ and $S_3$ that define the intervals. It was found more convenient to use the quantity $\theta$ as defined by relations (8) and (9) to select the appropriate equalizer.

In accordance with relation (8), $$\theta_i = (\pi/2)(f_2 - f_1)S_i \text{ for } i = 0, 1, 2 \text{ and } 3 \qquad (10)$$

Instead of comparing the measured slope S with values $S_0$, $S_1$, $S_2$ and $S_3$, the measured quantity $\theta$ is compared with the values $\theta_0$, $\theta_1$, $\theta_2$ and $\theta_3$ as defined by relation (10).

The measured value of $\theta$ is provided by detector 48 on output line 49 and is applied to comparison and selection device 50, an exemplary embodiment of which will be described with reference to FIG. 8. Device 50 compares the measured value of $\theta$ that is available on line 49 with $\theta_0$, $\theta_1$, $\theta_2$ and $\theta_3$ and causes switch 23 to be set to position A, B or C depending on whether the measured value of $\theta$ lies between $\theta_0$ and $\theta_1$, between $\theta_1$ and $\theta_2$, or between $\theta_2$ and $\theta_3$.

Figure 5:
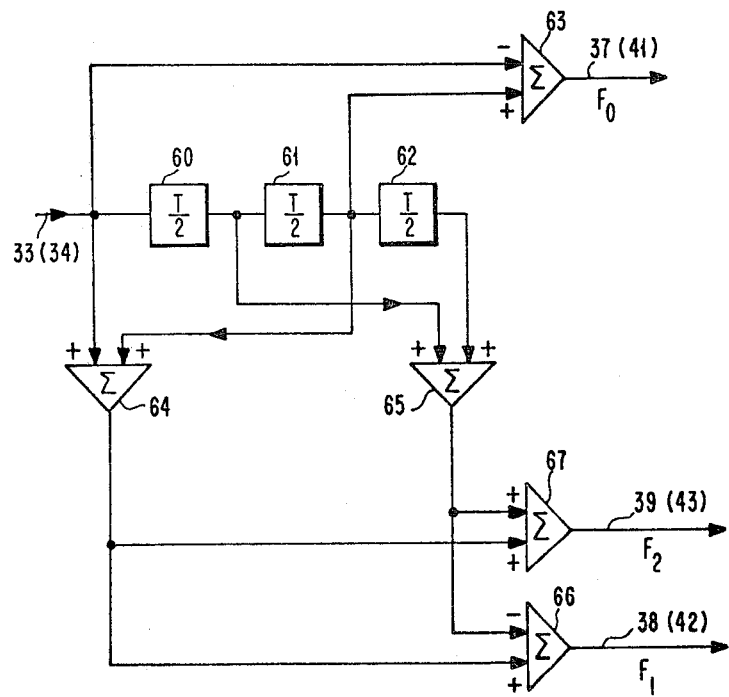
FIG. 5 illustrates an exemplary embodiment of the filters 35 and 36 used in the receiver of FIG. 4.

The general configuration of a digital filter which can be used as filter 35 or 36 is shown in FIG. 5 The reference numerals on the input and output lines of the filter shown in FIG. 5 relate to filter 35 while the reference numerals between parentheses relate to filter 36. The in-phase component of the received signal is applied via line 33 to a delay line comprising three delay elements 60, 61 and 62, each of which introduces a delay of T/2 seconds. The input signal on line 33 is substracted from the output signal from delay element 61 in a subtractor 63 which provides the in-phase component of signal $F_0$ on line 37. The input signal on line 33 is also added to the output signal from delay element 61 in adder 64. The output signal from delay element 60 is added to the output signal from delay element 62 in adder 65. The output signal from adder 65 is subtracted from the output signal from adder 64 in subtractor 66 which provides the in-phase component of signal $F_1$ on line 38. The output signals from adders 64 and 65 are added together in adder 67 which provides the in-phase component of signal $F_2$ on line 39.

When the filter shown in FIG. 5 is used as filter 36, it is provided with the quadrature component of the received signal via line (34) and supplies on lines (41), (42) and (43) the quadrature components of signals $F_0$, $F_1$ and $F_2$, respectively.

Figure 6:
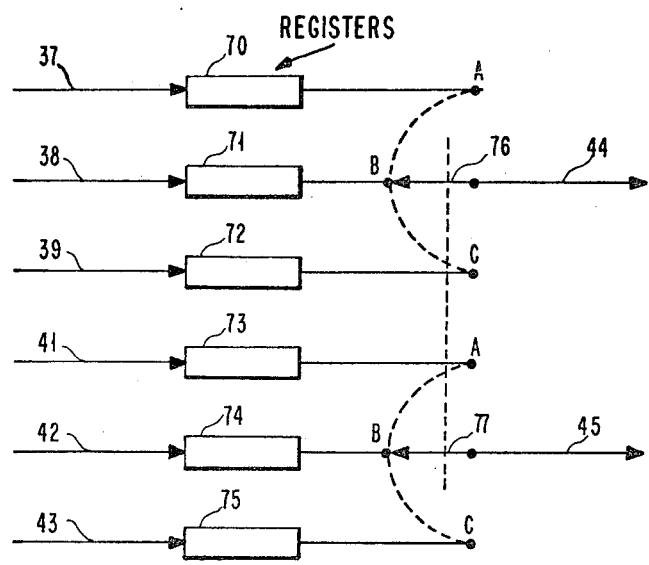
FIG. 6 shows an exemplary embodiment of the buffer 40 used in the receiver of FIG. 4.

FIG. 6 illustrates an exemplary digital embodiment of buffer 40. The in-phase components of signals $F_0$, $F_1$ and $F_2$ available on lines 37, 38 and 39 are stored in registers 70, 71 and 72, while the quadrature components of signals $F_0$, $F_1$ and $F_2$ available on lines 41, 42 and 43 are stored in registers 73, 74 and 75. The outputs of registers 70, 71 and 72 are connected to positions A, B and C, respectively, of a three-position switch 76, the output of which is connected to line 44. The outputs of registers 73, 74 and 75 are connected to positions A, B and C, respectively, of a three-position switch 77, the output of which is connected to line 45. Switches 76 and 77 are simultaneously set to one of the positions A, B and C. When both switches are set to position A, the contents of registers 70 and 73 are respectively applied to lines 44 and 45, and so on.

Figure 7:
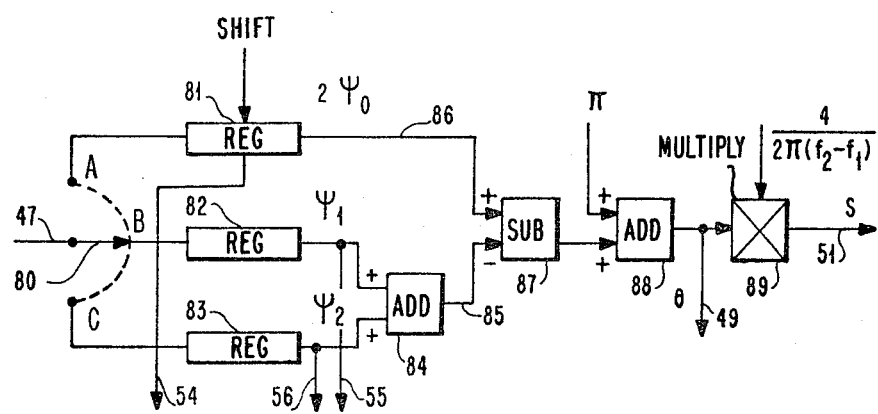
FIG. 7 shows an exemplary embodiment of the slope computation device 48 used in the receiver of FIG. 4.

FIG. 7 is an exemplary digital embodiment of the slope computation device 48. The output of phase detector 46 (FIG. 4) is connected via line 47 to the common input of a three-position switch 80 whose positions A, B and C are respectively connected to the input of a shift register 81 and to the inputs of two registers 82 and 83. Thus, the phases $\psi_0$, $\psi_1$ and $\psi_2$, successively computed by detector 46, are stored in registers 81, 82 and 83, respectively. The contents of shift register 81 are then shifted one bit position to the left so that, subsequent to this operation, register 81 will contain the quantity $2\psi_0$. An adder 84 whose inputs are connected to the outputs of registers 82 and 83 provides the sum $\psi_1$ and $\psi_2$ on its output line 85. The value $2\psi_0$ read out of register 81 is applied via line 86 to the (+) input of a subtractor 87 whose (−) input receives the sum $\psi_1 + \psi_2$ via line 85. Subtractor 87 provides the quantity $2\psi_0 - \psi_1 - \psi_2$ to which the value of $\pi$ is added by an adder 88. The quantity $$\theta = \pi + 2\psi_0 - \psi_1 - \psi_2$$

is available at the output of adder 88 on line 49. The value of $\theta$ is multiplied by the quantity $$\frac{4}{2\pi(f_2 - f_1)}$$

in multiplier 89.

Thus, multiplier 89 provides on its output line 51 the value of the slope S in accordance with relations (7) and (8).

Figure 8:
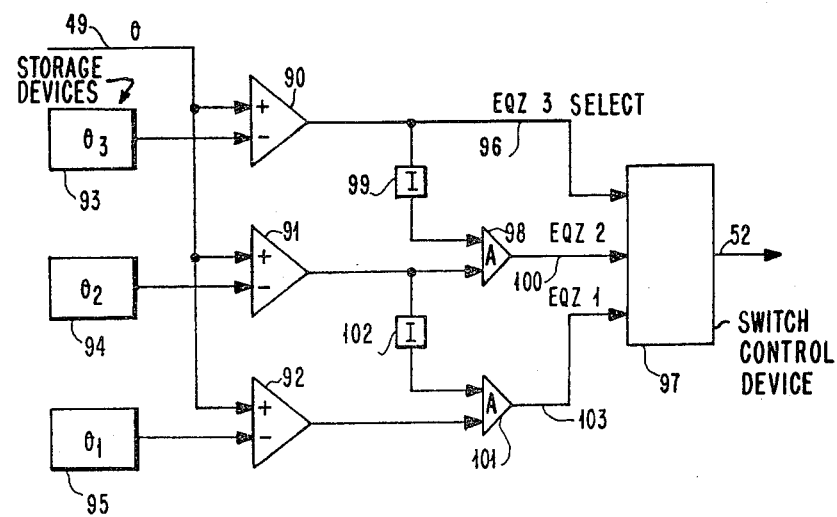
FIG. 8 shows an exemplary embodiment of the comparison and selection device 50 used in the receiver of FIG. 4.

FIG. 8 shows a digital embodiment of the comparison and selection device 50. The value of $\theta$ as computed by device 48 (FIG. 4) is applied via line 49 to the (+) inputs of three comparators 90, 91 and 92. The (−) inputs of these comparators are connected to storage means 93, 94 and 95, respectively, storing the values of $\theta_3$, $\theta_2$ and $\theta_1$, respectively. Comparators 90–92 provide an up level when the value of the signal applied to their (+) inputs exceeds that of the signal applied to their (−) inputs. The output of comparator 90 is connected via equalizer EQZ 3 selection line 96 to an input of a switch control device 97. The output from comparator 91 is applied to an input of a two-input AND gate 98, the other input of which receives the output from comparator 90 as inverted by an inverter 99. The output of AND gate 98 is connected to an input of control device 97 via equalizer EQZ 2 selection line 100. The output from comparator 92 is applied to an input of a two-input AND gate 101, the second input of which receives the output from comparator 91 as inverted by an inverter 102. The output of AND gate 101 is connected via equalizer EQZ 1 selection line 103 to an input of control device 97.

In operation, assuming for example, that $\theta_1 < \theta < \theta_2$, the output from comparator 90 is at a low level which deactivates line 96, and the output from comparator 91 is at a low level which inhibits AND gate 98, thereby deactivating line 100. The output from comparator 92 is at an up level and that from inverter 102 also is at an up level. Thus, AND gate 101 is enabled and activates EQZ 1 selection line 103. Control device 97 is a conventional device which causes switch 23 to be set to position A, B or C depending on whether line 103, 100 or 96 is activated.

Figure 9:
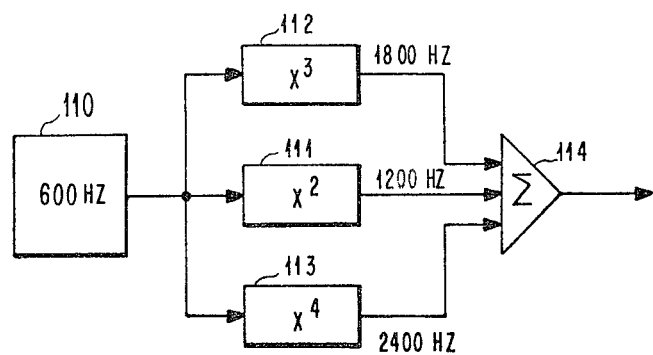
FIG. 9 shows an alternative embodiment of a measurement signal generation device.

There has been described, with reference to FIGS. 2-8, a transmission system which incorporates means for measuring the slope S and for automatically selecting a fixed equalizer from a set of available equalizers. In this system, successive carrier phase changes of $+\pi/2$ and $-\pi/2$ radians are used to generate the measurement signal comprised of three synchronous frequencies $f_0$, $f_1$ and $f_2$. Other means could be used to generate the measurement signal. For example, if it is desired to measure the slope S of a voiceband transmission channel, one may choose $f_0 = 1800$ Hz, $f_1 = 1200$ Hz and $f_2 = 2400$ Hz and generate the measurement signal from a 600 Hz oscillator as shown in FIG. 9. The measurement signal generation device shown in FIG. 9 includes a 600 Hz oscillator 110 and three frequency multipliers 111, 112 and 113 which multiply that frequency by two, by three and by four, respectively, so that they provide signals at 1200 Hz, 1800 Hz and 2400 Hz, respectively. The outputs from frequency multipliers 111-113 are summed in a summing device 114 which thus provides a measurement signal resulting from the superimposition of three sine waves of respective frequencies $f_0$, $f_1$ and $f_2$.

In this case, which is the general case, the three sine waves can be expressed in simplified form as follows:

$$\cos(2\pi f_0 t + \phi_0')$$
$$\cos(2\pi f_1 t + \phi_1') \qquad (1')$$
$$\cos(2\pi f_2 t + \phi_2')$$

where $\phi_0'$, $\phi_1'$ and $\phi_2'$ are the phases of the transmitted sine waves. Note that relations (1), which express the three sine waves making up the measurement signal generated by means of successive carrier phase changes of $+\pi/2$ and $-\pi/2$, are nothing but particular cases of the above relations (1'). Relations (1) are derived from relations (1') by giving phases $\phi_0'$, $\phi_1'$ and $\phi_2'$ the following values:

$$\phi_0' = -(\pi/4) \phi_1' = \phi_2' = +(\pi/4)$$

Using the assumptions made with respect to relations (1') relations (2) become:

$$\begin{aligned} F_0 &: \cos(2\pi f_0 t + \phi_0 + \phi_0') \\ F_1 &: \cos(2\pi f_1 t + \phi_1 + \phi_1') \\ F_2 &: \cos(2\pi f_2 t + \phi_2 + \phi_2') \end{aligned} \qquad (2')$$

Similarly, relations (4) become:

$$\begin{aligned} \psi_0 &= 2\pi f_0 t + \phi_0 + \phi_0' \\ \psi_1 &= 2\pi f_1 t + \phi_1 + \phi_1' \\ \psi_2 &= 2\pi f_2 t + \phi_2 + \phi_2' \end{aligned} \qquad (4')$$

Combining (6) and (4'), we find the general expression for slope S where the three generated sine waves of frequencies $f_0$, $f_1$ and $f_2$ have the respective phase $\phi_0'$, $\phi_1'$ and $\phi_2'$:

$$S = \frac{4}{2\pi(f_2 - f_1)} (2\psi_0 - \psi_1 - \psi_2 - 2\phi_0' + \phi_1' + \phi_2') \qquad (7')$$

The quantity $\theta$ defined by relation (8), which is repeated below for convenience $$\theta = (\pi/2)(f_2 - f_1) S \qquad (8)$$

becomes, starting with relation (7'):

$$\theta = 2\psi_0 - \psi_1 - \psi_2 - 2\phi_0' + \phi_1' + \phi_2' \qquad (9')$$

Note that by giving phases $\phi_0'$, $\phi_1'$ and $\phi_2'$ the values $$\phi_0' = -(\pi/4) \phi_1' = \phi_2' = (\pi/4)$$

in relations (7') and (9'), the relations (7) and (9) previously used are obtained.

It will be understood by those skilled in the art that the use of relation (7') to determine the slope S only requires minor changes in the device illustrated in FIGS. 4-8. All that need be done in the computation device of FIG. 7 is to add the corrective term $-2\phi_0' + \phi_1' + \phi_2'$ to the output signal from subtractor 87, instead of the value of $\pi$ as shown in the figure.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. A fixed-equalizer selection device for a data transmission system wherein a receiver includes a set of fixed equalizers, said device including:
    means for transmitting a measurement signal over a system transmission channel having a carrier frequency $f_0$ that undergoes consecutive phase changes of $+\pi/2$ and $-\pi/2$ radians at a signaling rate $1/T$;
    means for extracting from the received measurement signal components thereof at frequencies $f_0$, $f_1$ and $f_2$, said frequencies $f_1$ and $f_2$ being defined as $$f_1 = f_0 - \tfrac{1}{2}T \text{ and } f_2 = f_0 + \tfrac{1}{2}T;$$

means for extracting instantaneous phases $\psi_0$, $\psi_1$ and $\psi_2$ from the components at frequencies $f_0$, $f_1$ and $f_2$ of the received measurement signal;
    means for determining a quantity $\theta$ representative of the slope of the transmission channel envelope delay characteristic in accordance with the relation $$\theta = \pi + 2\psi_0 - \psi_1 - \psi_2$$

means for comparing said computed quantity $\theta$ with reference values that define different intervals, each of said intervals being associated with one of said fixed equalizers;

means for determining within which interval said computed quantity $\theta$ lies; and means for selecting the fixed equalizer associated with the determined interval.

2. An equalizer selection method for a data transmission system having a receiver including a set of N fixed equalizers, N being an integer, comprising the steps of:

measuring a quantity $\theta$ by sending over the transmission channel a measurement signal having a frequency spectrum consisting of three rays at frequencies $f_0$, $f_1$ and $f_2$, said frequencies $f_1$ and $f_2$ lying at the edges of a passband of the channel and frequency $f_0$ being midway between $f_1$ and $f_2$, extracting from said received measurement signal the components thereof at said frequencies $f_0$, $f_1$ and $f_2$, extracting instantaneous phases $\psi_0$, $\psi_1$ and $\psi_2$ from said components of the received measurement signal at said frequencies $f_0$, $f_1$ and $f_2$, and computing a quantity $\theta$ representative of a slope S of the envelope delay characteristic of the channel in accordance with a relation $\theta = 2\psi_0 - \psi_1 - \psi_2 - 2\phi_0' + \phi_1' + \phi_2'$; and selecting an appropriate fixed equalizer according to the value of the quantity $\theta$.

3. A method according to claim 2, wherein said equalizer selection step includes the steps of:

comparing said measured quantity $\theta$ with reference values that define different intervals of slope values, each interval being associated with one of said fixed equalizers, determining the interval within which the measured quantity $\theta$ lies, and selecting the fixed equalizer associated with the determined interval.

4. Apparatus for generating a signal from which the slope of an envelope delay characteristic of a transmission channel can be determined for a region bounded by lower and upper frequencies, comprising:

means for generating a measurement signal for transmission over said channel, the measurement signal having components at the lower and upper frequencies and at a middle frequency midway between the lower and upper frequencies;

means for receiving the transmitted measurement signal and for extracting therefrom signals proportional to the instantaneous phases of the received signal at the lower, middle and upper frequencies; and means connected to said extracting means for generating a signal proportional to the slope of the envelope delay characteristic in the region defined by the lower and upper frequencies as a function of the three instantaneous phase signals and a signal proportional to the difference between the lower and upper frequencies, said slope signal generating means further comprising, shift register means for receiving and shifting the instantaneous phase signal for the middle frequency to double the signal value, an adder circuit for summing the instantaneous phase signals for the lower and upper frequencies, a subtractor circuit for subtracting the output signal from said adder circuit from the output signal from said shift register circuit, a second adder circuit for incrementing the output signal from said subtractor circuit by a predetermined constant, and a multiplier circuit for generating an output signal directly proportional to the output signal from said second adder circuit and inversely proportional to the difference between the lower and upper frequencies.

5. Apparatus as defined in claim 4 wherein said measurement signal generating means comprises means for generating a lower frequency of $f_1 = f_0 - (1/2T)$ and an upper frequency of $f_2 = f_0 + (1/2T)$ where $f_0$ is the middle frequency and $1/T$ is the signaling rate.

6. Apparatus as defined in claim 5 wherein said extracting means further comprises:

means for sampling the received measurement signal at a predetermined rate;

transformer means for separating the sampled measurement signal into its in-phase and quadrature components;

means for filtering each of said components to derive the in-phase and quadrature components at the lower, middle and upper frequencies; and means for combining the in-phase and quadrature components at each of the frequencies to extract the instantaneous phase signals for each frequency.

7. A system for initializing a transmitter/receiver transmission channel by selecting one of a plurality of analog fixed equalizers at the receiver input from the channel as a function of the slope of the envelope delay characteristic of the channel in a region bounded by lower and upper frequencies, said system including:

means for applying a measurement signal at the transmitter output to the channel, the measurement signal having components at the lower and upper frequencies and at a middle frequency midway between the lower and upper frequencies;

means for receiving the measurement signal from the channel and for extracting therefrom signals proportional to the instantaneous phases of the received signal at the lower, middle and upper frequencies;

means connected to said extracting means for generating a signal proportional to the slope of the envelope delay characteristic, the magnitude of the generated signal being a function of the values of the instantaneous phase signals for the lower, middle and upper frequencies; and means for comparing the generated signal to stored reference values characteristic of the available analog fixed equalizers to switch a selected one of the equalizers into the receiver circuit.

8. A system as defined in claim 7 wherein said comparing means further comprises:

a plurality of comparator devices, each having a first input from said slope signal generating means and a second input from a storage means for storing a reference value characteristic of one of the available analog fixed equalizers;

logic means having inputs from said comparator devices and a plurality of outputs, said logic means being responsive to the relative values of the generated signal and reference values to provide a select signal on only one of said outputs; and switching means connected to the outputs from said logic means for switching one of the equalizers into the receiver circuit.

9. A system as defined in claim 8 wherein said measurement signal generating means comprises means for generating a lower frequency $f_1 = f_0 - (1/2T)$ and an upper frequency of $f_2 = f_0 + (1/2T)$ where $f_0$ is the middle frequency and $1/T$ is the signaling rate.

10. A system as defined in claim 9 wherein said extracting means further comprises:
   means for sampling the received measurement signal at a predetermined rate;
   transformer means for separating the sampled measurement signal into its in-phase and quadrature components;
   means for filtering each of said components to derive the in-phase and quadrature components at the lower, middle and upper frequencies; and
   means for combining the in-phase and quadrature components at each of the frequencies to extract the instantaneous phase signals for each frequency.

11. A method of initializing a transmitter/receiver channel by selecting one of a plurality of analog fixed equalizers at a receiver input from the transmission channel as a function of the slope of the envelope delay characteristic of the channel in a region bounded by lower and upper frequencies, said method including the steps of:
   transmitting a measurement signal through the channel, the measurement signal having components at the lower and upper frequencies and at a middle frequency midway between the lower and upper frequencies;
   receiving the transmitted signal and extracting therefrom signals proportional to the instantaneous phases of the received signal at the lower, middle and upper frequencies;
   generating a slope-related signal as a function of the values of the extracted instantaneous phase signals;
   comparing the generated slope-related signal to stored reference signals characteristic of the different fixed equalizers; and
   switching one of the equalizers into the receiver circuit when a predetermined relationship is found between the slope-related signal and the stored reference signal characteristic of that equalizer.

12. A method as defined in claim 11 wherein said comparing step further includes the steps of:
   simultaneously comparing the slope-related signal with each stored reference signal;
   generating an output signal having a predetermined level for each reference signal which is exceeded by the slope-related signal;
   logically combining the output signals to produce a single equalizer selecting signal associated with the highest reference signal which is exceeded by the slope-related signal.

13. A method as defined in claim 12 wherein the extracting step includes the further steps of:
   sampling the received measurement signal at a predetermined rate;
   separating the sampled measurement signal into its in-phase and quadrature components;
   filtering each of the components to derive the in-phase and quadrature components at the lower, middle and upper frequencies; and
   combining the in-phase and quadrature components at each of the frequencies to extract the instantaneous phase at each frequency.

* * * * *